April 21, 1931.   G. W. HELSEL   1,801,272
FRUIT GATHERER
Filed Nov. 18, 1929   2 Sheets-Sheet 1
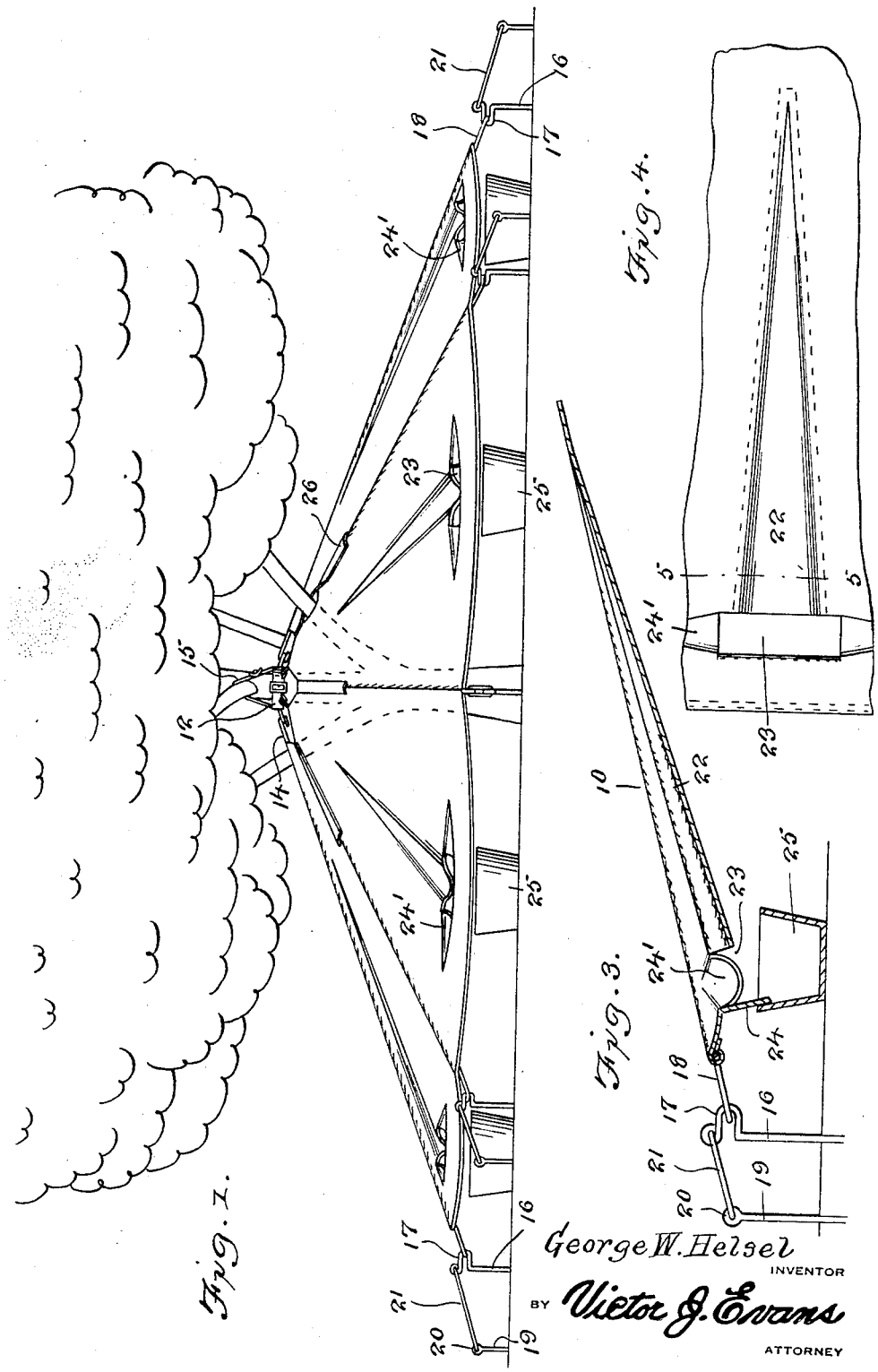

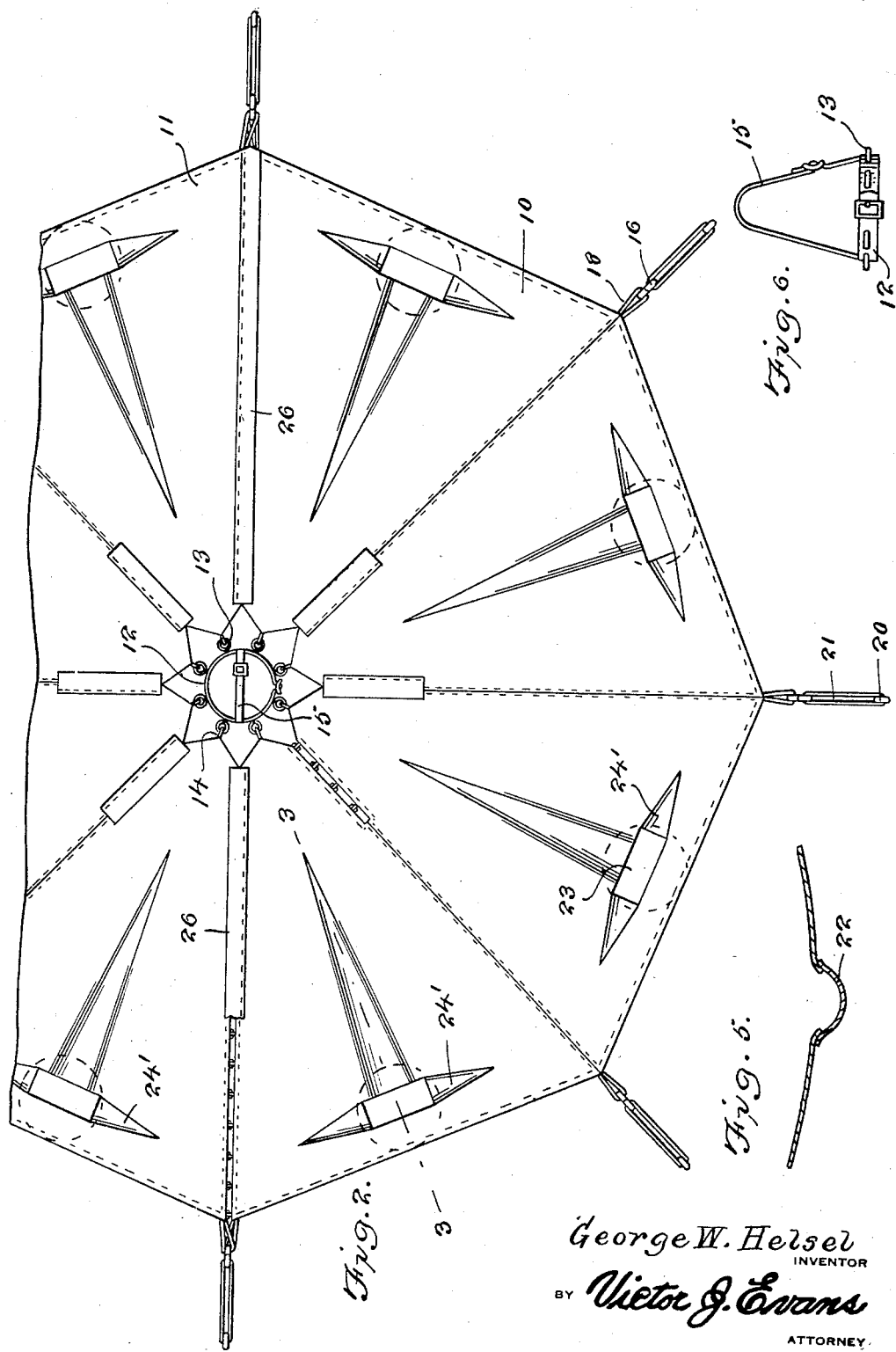

Patented Apr. 21, 1931

1,801,272

UNITED STATES PATENT OFFICE

GEORGE W. HELSEL, OF COLUMBUS, OHIO

FRUIT GATHERER

Application filed November 18, 1929. Serial No. 408,037.

This invention relates to new and useful improvements in harvesters and more particularly to that form of harvesters known as fruit gatherers.

An object of the invention consists of a form of covering designed to be arranged about the trunk of a tree and beneath the branches therefor whereby the fruit may be shaken from the tree upon the covering unbruised.

Another object of the invention contemplates the provision and arrangement of a band to be passed about the trunk of a tree and limb therefor to maintain the covering in the formation of a cone to direct the falling fruit away from the tree trunk.

An additional object of the invention embodies a multiplicity of supporting members for the covering beyond the tree trunk.

A further object of the invention comprehends a plurality of guide passageways in the covering for directing the falling fruit toward and through openings in the covering and within receptacles located immediately therebeneath.

More specifically stated the coverings are provided with deflectors for the fruit adjacent the openings to prevent bruising of the fruit incident to being brought into sudden contact with the receptacles.

With the above and other objects in view, the invention further consists of the following novel features and details of construction to be hereinafter more fully described, illustrated in the accompanying drawings and pointed out in the appended claim.

In the drawings:

Figure 1 is an elevation of my invention as applied for use.

Figure 2 is a fragmentary top plan view of the invention.

Figure 3 is a sectional view taken on line 3—3 of Figure 2.

Figure 4 is a fragmentary top plan view of the covering illustrating the arrangement of the passageways and discharge openings.

Figure 5 is a horizontal sectional view taken on line 5—5 of Figure 4.

Figure 6 is an elevation of the band and strap.

Referring to the drawings in detail wherein like characters of reference denote corresponding parts, the reference characters 10 and 11 indicate the sections of a covering provided with hook and ring connections therebetween to facilitate the disposition of a tree trunk therebetween at the center of the completed covering. An adjustable band or belt 12, designed to encicle a portion of a tree trunk at an appropriate point in the height thereof, is provided with rings 13 upon the outer side thereof for connection with hook members 14 disposed in a circuitous course about the central opening in the completed covering.

A limb strap 15, having connection at its ends with the band or strap 12, is designed for coaction with the latter in the retention of the covering in cone formation, as evidenced from the illustration of my invention in Figure 1 of the drawings.

Supporting legs or standards, indicated as at 16, arranged circumferentially of the completed covering beyond the outermost marginal edge thereof and at spaced intervals, are shaped to provide horizontally disposed U-shaped portions 17 to accommodate the loops 18 of a length of rope stitched or otherwise secured to the outer marginal edge of the completed covering as best shown in the Figure 3 illustration.

Auxiliary legs 19, having eyes or closed loops 20 formed upon the uppermost ends thereof, after the manner of the free ends of the horizontally disposed U-shaped members 17 of the standards 16, accommodate a form of linkage 21 therebetween. This connection is especially desirous in view of the fact that the further the auxiliary legs 19 are driven into the ground the more outward pull will be exercised upon the upper ends of the standards 16 whereby slack may be taken out of the covering at the portions indicated. The covering, is in addition, provided with passageways of V-shape formation between the rope loops 18. These passageways are provided by the formation of elongated V-shaped slots in the covering and the stitching of a wider length of material, such as indicated at 22, therebeneath and sloped in the manner shown in Figure 3 of the drawings.

In other words, the fruit shaken from the tree and falling upon the covering will be directed toward the passageways, incident to the sagging of the portions of the covering between the rope loop formations. Discharge openings 23 formed in the covering adjacent the wider depending ends of the passageways form flaps 24 incident to the provision thereof and which are designed to extend for appreciable distances within the mouths of receptacles 25 located immediately beneath said discharge openings. The fruit entering the passageway and gaining velocity during its oblique descent toward the discharge openings 23 will strike against those portions of the flap 24 between the openings 23 and the adjacent peripheries of the receptacles 25 and thence fall within the receptacles. The fall and velocity of the form of fruit will be broken whereby bruising incident to sudden contact with receptacles will be obviated.

As will be further noted from the illustration of my invention, the discharge openings 23 are also in communication with laterally and oppositely projecting valleys, grooves or passageways 24' whereby such of the fruit which is not directed inwardly toward the V-shaped passageways will be caught in the valleys 24' and directed through the openings 23 into the receptacles.

As shown in the top plan view in Figure 2 of the drawings, the hook and ring connections between the sections 10 and 11 are covered by forms of flaps 26 whereby the fruit may not pass therebetween nor be caused to become injured through contact therewith.

It may be found desirous in the application of the invention upon different varieties of trees deformed ones and the like, to arrange the trunk band above the trunk and hook the strap therefor over one of the adjacent limbs. It may be also desirous in this instance of application to provide guy ropes and the like upon the trunk strap and have connection at their outer ends with portions of the tree or may be extended over the limbs and staked into the ground beyond the edge of the covering.

The invention is susceptible of various changes in its form, proportions and minor details of construction and the right is herein reserved to make such changes as properly fall within the scope of the appended claim.

Having thus described the invention, what is claimed is:—

A fruit gatherer comprising a covering of cone-shape formation arranged about the trunk of a tree and beneath the branches therefor, said covering having V-shaped slots radially disposed at intervals thereon, lengths of material of wider dimensions than said slots being secured to the covering therebeneath and sagged in the middle to define passageways, the coverings being further provided with discharge openings at the ends of the passageways spaced from the adjacent edge of the covering, the covering having transverse valley portions disposed for communication with the discharge openings, and flaps extended from the outer portions of the discharge openings to break the fall of fruit directed thereagainst.

In testimony whereof, I affix my signature.

GEORGE W. HELSEL.